(12) United States Patent
Wantland et al.

(10) Patent No.: US 10,912,409 B2
(45) Date of Patent: Feb. 9, 2021

(54) ELECTRICALLY CONNECTED SINGLE SERVE BEVERAGE DISPENSER FOR A REFRIGERATOR APPLIANCE

(71) Applicant: Haier US Appliance Solutions, Inc., Wilmington, DE (US)

(72) Inventors: Louis A. Wantland, Louisville, KY (US); Bagawathkumar Chellappan, Prospect, KY (US)

(73) Assignee: Haier US Appliance Solutions, Inc., Wilmington, DE (US)

( * ) Notice: Subject to any disclaimer, the term of this patent is extended or adjusted under 35 U.S.C. 154(b) by 0 days.

(21) Appl. No.: 16/045,844

(22) Filed: Jul. 26, 2018

(65) Prior Publication Data

US 2020/0029725 A1  Jan. 30, 2020

(51) Int. Cl.
| | |
|---|---|
| *A47J 31/40* | (2006.01) |
| *F25D 23/12* | (2006.01) |
| *F25D 23/02* | (2006.01) |
| *B67D 1/08* | (2006.01) |
| *F25C 5/20* | (2018.01) |

(52) U.S. Cl.
CPC .......... *A47J 31/407* (2013.01); *B67D 1/0888* (2013.01); *F25C 5/22* (2018.01); *F25D 23/028* (2013.01); *F25D 23/126* (2013.01); *B67D 2210/00036* (2013.01); *F25D 2400/02* (2013.01)

(58) Field of Classification Search
CPC .... A47J 31/407; F25D 23/028; F25D 23/126; F25D 2400/02; F25C 5/22
See application file for complete search history.

(56) References Cited

U.S. PATENT DOCUMENTS

| | | | | |
|---|---|---|---|---|
| 5,907,993 A | * | 6/1999 | Van Camp | A47J 31/007 99/280 |
| 6,067,894 A | * | 5/2000 | Eugster | A47J 31/404 99/280 |
| 8,171,843 B1 | * | 5/2012 | Heffington | A47J 31/0573 99/282 |
| 9,352,950 B2 | * | 5/2016 | Berger | B67D 1/0014 |
| 9,841,227 B2 | | 12/2017 | Hwang et al. | |

(Continued)

FOREIGN PATENT DOCUMENTS

| | | |
|---|---|---|
| CN | 102338536 | 2/2012 |
| CN | 107912982 | 4/2018 |

(Continued)

OTHER PUBLICATIONS

International Search Report, PCT No. PCT/CN2019/097312, dated Oct. 23, 2019, 4 pages.

*Primary Examiner* — Kun Kai Ma
(74) *Attorney, Agent, or Firm* — Dority & Manning, P.A.

(57) ABSTRACT

A brew module for use with a refrigerator appliance is provided. The brew module includes a brewing body removably mounted to a dispensing assembly of the refrigerator appliance. The brewing body defines a brew chamber configured to receive a brew pod and a flow of heated water from the dispensing assembly to mix with contents of the brew pod to create a beverage. Electrical contacts positioned on the brew module electrically couple the brew module and the dispensing assembly, e.g., to power a user interface panel and/or communicate data such as pod type, a desired temperature and volume of water, etc.

17 Claims, 6 Drawing Sheets

(56) References Cited

U.S. PATENT DOCUMENTS

| | | | |
|---|---|---|---|
| 2005/0132892 A1* | 6/2005 | Hall | A47J 31/047 99/279 |
| 2006/0196365 A1* | 9/2006 | Garman | A47J 31/10 99/306 |
| 2009/0057341 A1* | 3/2009 | Girard | A47J 31/402 222/129.1 |
| 2009/0241782 A1* | 10/2009 | Van Dillen | A47J 31/407 99/279 |
| 2012/0017629 A1* | 1/2012 | Shin | F25D 23/12 62/389 |
| 2012/0104021 A1 | 5/2012 | Cur et al. | |
| 2012/0104026 A1* | 5/2012 | Hortin | F25D 31/002 99/275 |
| 2014/0263432 A1* | 9/2014 | Jacobs | A47J 31/52 222/65 |
| 2015/0060490 A1 | 3/2015 | Bird | |
| 2015/0060491 A1* | 3/2015 | Bird | A47J 31/465 222/146.6 |
| 2015/0234364 A1* | 8/2015 | Gardner | G05B 19/042 700/275 |
| 2016/0073819 A1* | 3/2016 | Licare | A47J 31/462 426/425 |
| 2016/0205988 A1 | 7/2016 | Bird et al. | |
| 2016/0296065 A1* | 10/2016 | Doglioni Majer | A47J 31/56 |
| 2017/0135514 A1* | 5/2017 | Caputa | A47J 31/002 |
| 2017/0245675 A1* | 8/2017 | Junge | A47J 31/401 |
| 2018/0008087 A1 | 1/2018 | Miller et al. | |
| 2018/0084938 A1* | 3/2018 | Sakthivel | A47J 31/407 |
| 2018/0220832 A1* | 8/2018 | Psarologos | A47J 31/44 |
| 2018/0299190 A1* | 10/2018 | Sakthivel | F25D 23/126 |
| 2019/0032992 A1* | 1/2019 | Platts | F25D 23/126 |
| 2019/0144252 A1* | 5/2019 | von Kraus | B67D 1/0074 222/129.1 |

FOREIGN PATENT DOCUMENTS

| | | |
|---|---|---|
| CN | 107928408 A1* | 4/2018 |
| FR | 2912124 | 10/2012 |

\* cited by examiner

ELECTRICALLY CONNECTED SINGLE SERVE BEVERAGE DISPENSER FOR A REFRIGERATOR APPLIANCE

FIELD OF THE INVENTION

The present subject matter relates generally to refrigerator appliances, and more particularly to single serve beverage dispensers for use in refrigerator appliances.

BACKGROUND OF THE INVENTION

Refrigerator appliances can include a dispensing assembly for directing ice from the refrigerator's ice maker and/or liquid water to the dispensing assembly. A user can activate the dispensing assembly to direct a flow of ice or liquid water into a cup or other container positioned within the dispensing assembly. Liquid water directed to the dispensing assembly is generally chilled or at an ambient temperature. However, certain refrigerator appliances also include features for dispensing heated liquid water that can be used to make hot beverages, such as coffee or tea.

In some cases, users may desire only a single serving of a hot beverage, and some refrigerator appliances may include a dispensing assembly with features for utilizing single serve brew pods to dispense single serve beverages. For example, a conventional dispensing assembly may include a brew module having a brew chamber for receiving brew pods. Such brew pods typically contain a substance for creating a beverage, such as, e.g., coffee, tea, hot chocolate, lemonade, or the like, when water is passed through the brew pod.

Conventional brew modules are simple mechanical modules that receive and contain a brew pod during dispensing. However, these passive brew modules provide no other features for controlling the dispensing process, providing a user with operating status indicators or a user interface, improving visibility or lighting, or otherwise improving the user experience.

Accordingly, a refrigerator appliance that includes improved features for dispensing single serve beverages would be useful. More specifically, single serve beverage dispensing assemblies with improved functionality and user convenience features would be particularly beneficial.

BRIEF DESCRIPTION OF THE INVENTION

Aspects and advantages of the invention will be set forth in part in the following description, or may be apparent from the description, or may be learned through practice of the invention.

In accordance with one embodiment, a refrigerator appliance is provided. The refrigerator appliance includes a cabinet defining a chilled chamber, a door being rotatably hinged to the cabinet to provide selective access to the chilled chamber, the door defining a dispenser recess, and a dispensing assembly positioned within the dispenser recess for providing a flow of water. A brew module is removably mounted to the dispensing assembly and includes a brewing body defining a brew chamber configured to receive a brew pod and the flow of water from the dispensing assembly to mix with contents of the brew pod to create a beverage. Electrical contacts are positioned on the brew module to electrically couple the brew module and the dispensing assembly.

In accordance with another embodiment, a brew module for use with a refrigerator appliance is provided. The refrigerator appliance includes a dispensing assembly for providing a flow of water. The brew module includes a brewing body removably mounted to the dispensing assembly, the brewing body defining a brew chamber configured to receive a brew pod and the flow of water from the dispensing assembly to mix with contents of the brew pod to create a beverage. Electrical contacts are positioned on the brew module to electrically couple the brew module and the dispensing assembly.

These and other features, aspects and advantages of the present invention will become better understood with reference to the following description and appended claims. The accompanying drawings, which are incorporated in and constitute a part of this specification, illustrate embodiments of the invention and, together with the description, serve to explain the principles of the invention.

BRIEF DESCRIPTION OF THE DRAWINGS

A full and enabling disclosure of the present invention, including the best mode thereof, directed to one of ordinary skill in the art, is set forth in the specification, which makes reference to the appended figures.

Figure 1:
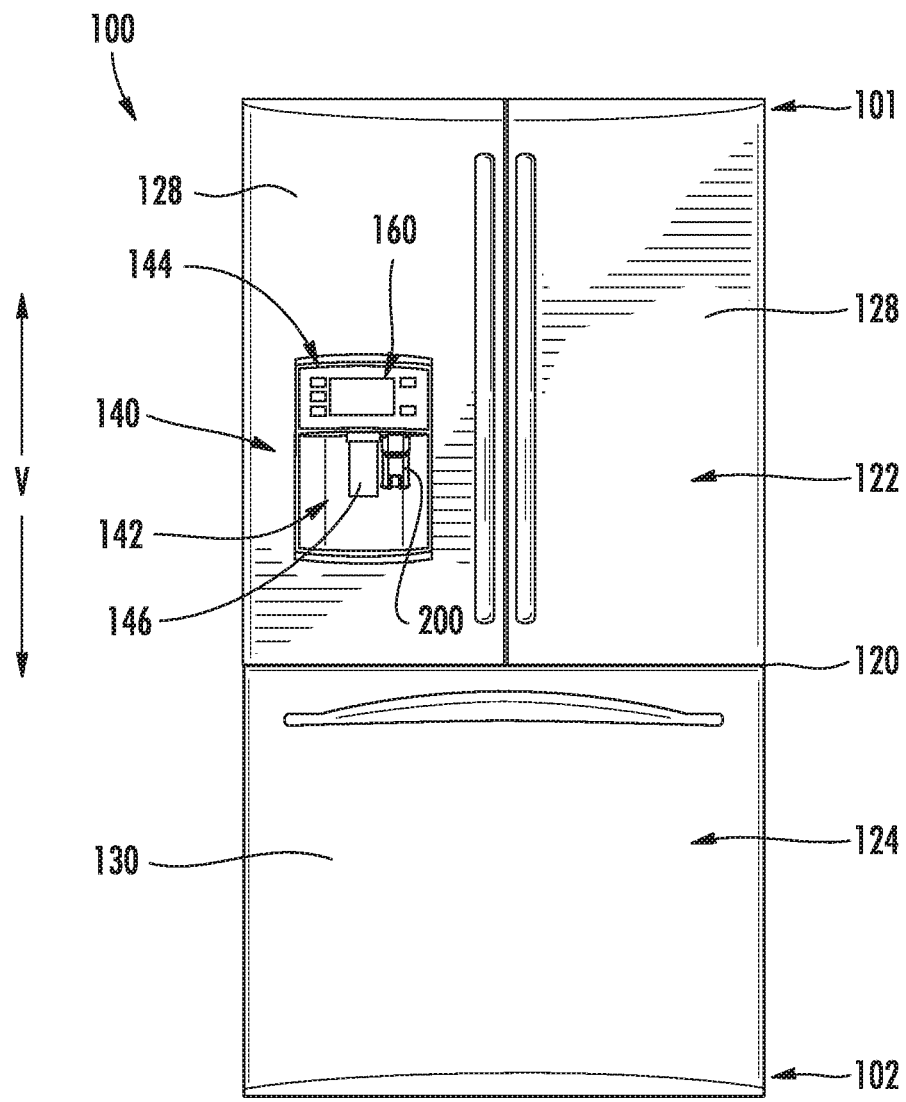
FIG. 1 provides a front view of a refrigerator appliance according to an exemplary embodiment of the present subject matter.

Repeat use of reference characters in the present specification and drawings is intended to represent the same or analogous features or elements of the present invention.

DETAILED DESCRIPTION

Reference now will be made in detail to embodiments of the invention, one or more examples of which are illustrated in the drawings. Each example is provided by way of explanation of the invention, not limitation of the invention. In fact, it will be apparent to those skilled in the art that various modifications and variations can be made in the present invention without departing from the scope or spirit of the invention. For instance, features illustrated or described as part of one embodiment can be used with another embodiment to yield a still further embodiment. Thus, it is intended that the present invention covers such modifications and variations as come within the scope of the appended claims and their equivalents.

FIG. 1 provides a front, elevation view of a refrigerator appliance 100 according to an exemplary embodiment of the present subject matter. Refrigerator appliance 100 includes a cabinet or housing 120. Housing 120 extends between an upper portion 101 and a lower portion 102 along a vertical direction V. Housing 120 defines chilled chambers, e.g., a fresh food compartment 122 positioned adjacent upper portion 101 of housing 120 and a freezer compartment 124 arranged at lower portion 102 of housing 120. Housing 120 also defines a mechanical compartment (not shown) for receipt of a sealed cooling system for cooling fresh food compartment 122 and freezer compartment 124.

Refrigerator appliance 100 is generally referred to as a bottom-mount refrigerator appliance. However, it should be understood that refrigerator appliance 100 is provided by way of example only. Thus, the present subject matter is not limited to refrigerator appliance 100 and may be utilized in any suitable refrigerator appliance. For example, one of skill in the art will understand that the present subject matter may be used with side-by-side style refrigerator appliances or top-mount refrigerator appliances as well.

Refrigerator doors 128 are rotatably hinged to housing 120 proximate fresh food compartment 122 in order to permit selective access to fresh food compartment 122. A freezer door 130 is arranged below refrigerator doors 128 for accessing freezer compartment 124. Freezer door 130 is mounted to a freezer drawer (not shown) slidably coupled within freezer compartment 124.

Refrigerator appliance 100 may also include a dispensing assembly 140 for dispensing various fluids, such as liquid water and/or ice, to a dispenser recess 142 defined on one of refrigerator doors 128. Dispensing assembly 140 includes a dispenser 144 positioned on an exterior portion of refrigerator appliance 100, for example, within dispenser recess 142. Dispenser 144 includes several outlets for accessing ice, chilled liquid water, and heated liquid water. To access ice, chilled liquid water, and heated liquid water, water-dispensing assembly 140 may for example include a paddle 146 mounted below a chilled water outlet 150, an ice outlet 152, and a heated water outlet 154.

To operate dispensing assembly 140, a user can urge a vessel, such as a cup, against paddle 146 to initiate a flow of chilled liquid water, heated liquid water and/or ice into the vessel within dispenser recess 142. In particular, a control panel or user interface panel 160 may be provided for controlling the mode of operation of dispenser 144, e.g., for selecting chilled liquid water, heated liquid water, crushed ice and/or whole ice. User interface panel 160 can include a chilled water dispensing button (not labeled), an ice-dispensing button (not labeled) and a heated water dispensing button (not labeled) for selecting between chilled liquid water, ice and heated liquid water, respectively. User interface panel 160 may also include a display component, such as a digital or analog display device designed to provide operational feedback to the user.

Outlets 150, 152, and 154 and paddle 146 may be an external part of dispenser 144, and are positioned at or adjacent dispenser recess 142, e.g., a concave portion defined in an outside surface of refrigerator door 128. Dispenser 144 is positioned at a predetermined elevation convenient for a user to access ice or liquid water, e.g., enabling the user to access ice without the need to bend-over and without the need to access freezer compartment 124. In the exemplary embodiment, dispenser 144 is positioned at a level that approximates the chest level of a user.

Operation of the refrigerator appliance 100 can be regulated by a controller 162 that is operatively coupled to user interface panel 160 and/or various sensors as discussed below. User interface panel 160 provides selections for user manipulation of the operation of refrigerator appliance 100 such as e.g., selections between whole or crushed ice, chilled water, and/or other various options. In response to user manipulation of the user interface panel 160 or sensor signals, controller 162 may operate various components of the refrigerator appliance 100. Controller 162 may include a memory and one or more microprocessors, CPUs or the like, such as general or special purpose microprocessors operable to execute programming instructions or micro-control code associated with operation of refrigerator appliance 100. The memory may represent random access memory such as DRAM, or read only memory such as ROM or FLASH. In one embodiment, the processor executes programming instructions stored in memory. The memory may be a separate component from the processor or may be included onboard within the processor. Alternatively, controller 162 may be constructed without using a microprocessor, e.g., using a combination of discrete analog and/or digital logic circuitry (such as switches, amplifiers, integrators, comparators, flip-flops, AND gates, and the like) to perform control functionality instead of relying upon software.

Controller 162 may be positioned in a variety of locations throughout refrigerator appliance 100. In the illustrated embodiment, controller 162 is located within the user interface panel 160. In other embodiments, the controller 162 may be positioned at any suitable location within refrigerator appliance 100, such as for example within a fresh food chamber, a freezer door, etc. Input/output ("I/O") signals may be routed between controller 162 and various operational components of refrigerator appliance 100. For example, user interface panel 160 may be in communication with controller 162 via one or more signal lines or shared communication busses.

As illustrated, controller 162 may be in communication with the various components of dispensing assembly 160 and may control operation of the various components. For example, the various valves, switches, etc. may be actuatable based on commands from the controller 162. As discussed, interface panel 160 may additionally be in communication with the controller 162. Thus, the various operations may occur based on user input or automatically through controller 162 instruction.

Refrigerator appliance 100 also includes features for generating heated liquid water and directing such heated liquid water to dispenser 144. Thus, refrigerator appliance 100 need not be connected to a residential hot water heating system in order to supply heated liquid water to dispenser 144. In this regard, as shown for example in FIG. 2, dispensing assembly 140 may be in fluid communication with a water supply source 170, such as a municipal water supply for receiving a flow of water. A sealed system 172 may be used to chill water from water supply source 170, e.g., to provide a flow of chilled water (as indicated by reference numeral 174) which may be dispensed through chilled water outlet 150. In addition, refrigerator appliance 100 may include a heating element or a heating assembly 176 which heats water to provide a flow of heated water (as indicated by reference numeral 178). According to exemplary embodiments, features of such heating assembly 176 may include, for example, a variety of water supplies, hot water tanks, heating elements, temperature sensors, and control valves to heat water from a well or municipal water supply, store the heated water, and supply the heated water to dispenser 144.

Dispensing assembly 140 is preferably capable of providing heated water at various temperatures depending on the type of beverage being brewed. For example, when brewing ground coffee, water for brewing is preferably heated to between one hundred and eighty degrees Fahrenheit and one hundred and ninety degrees Fahrenheit. However, according to alternative embodiments, dispensing assembly 140 may be adjusted to provide water for making beverages at any suitable temperature.

Referring now generally to FIGS. 2 through 6, dispensing assembly 140 includes a brew module 200 according to an exemplary embodiment of the present subject matter. Brew module 200 is mountable within dispenser recess 142 such that brew module 200 is in fluid communication with hot water outlet 154 when mounted within dispenser recess 142. Thus, the flow of heated water 178 from hot water outlet 154 may flow into brew module 200.

Figure 5:
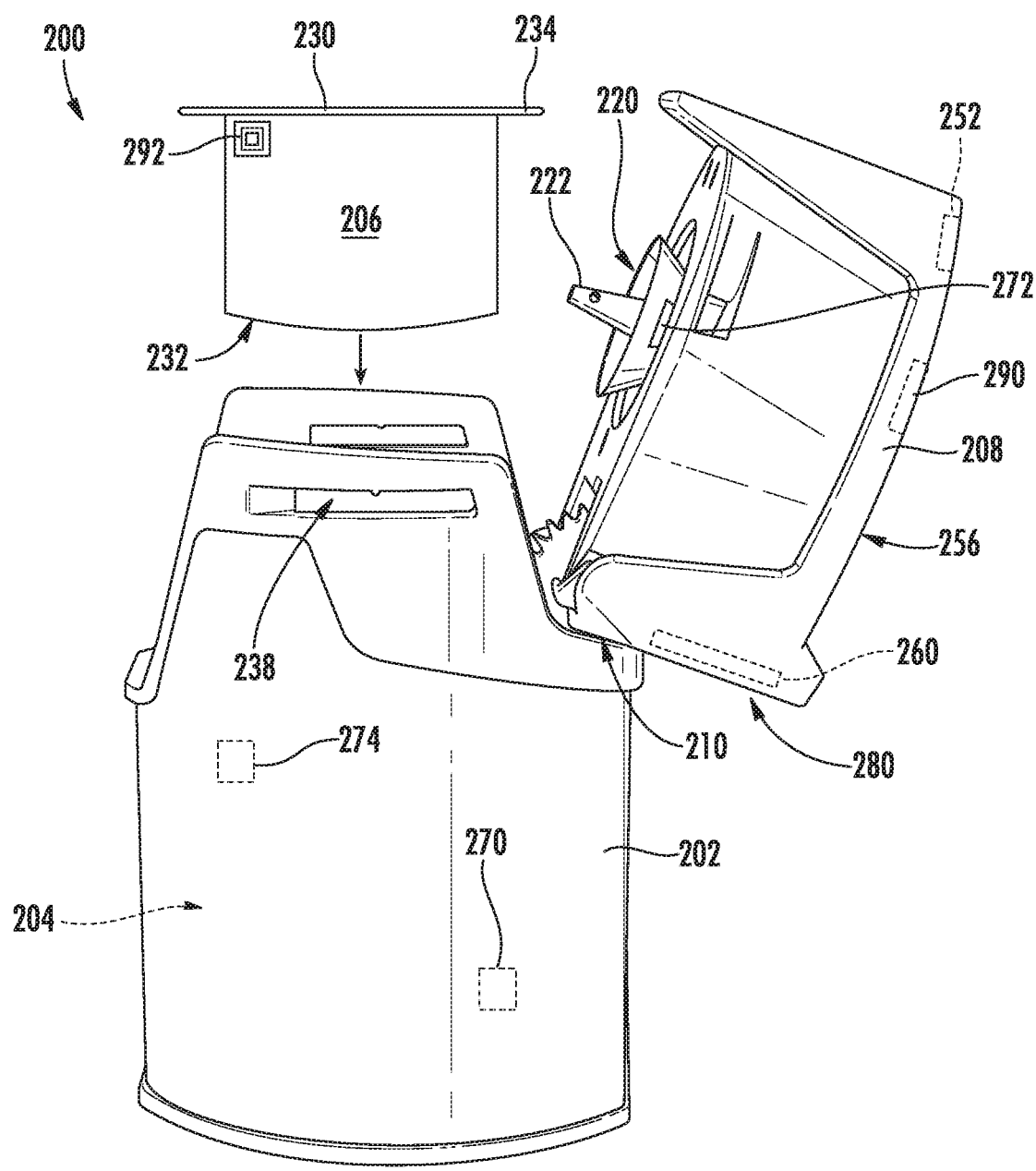
FIG. 5 provides a perspective view of the exemplary brew module of FIG. 3, with the lid shown in the open position.
Figure 6:
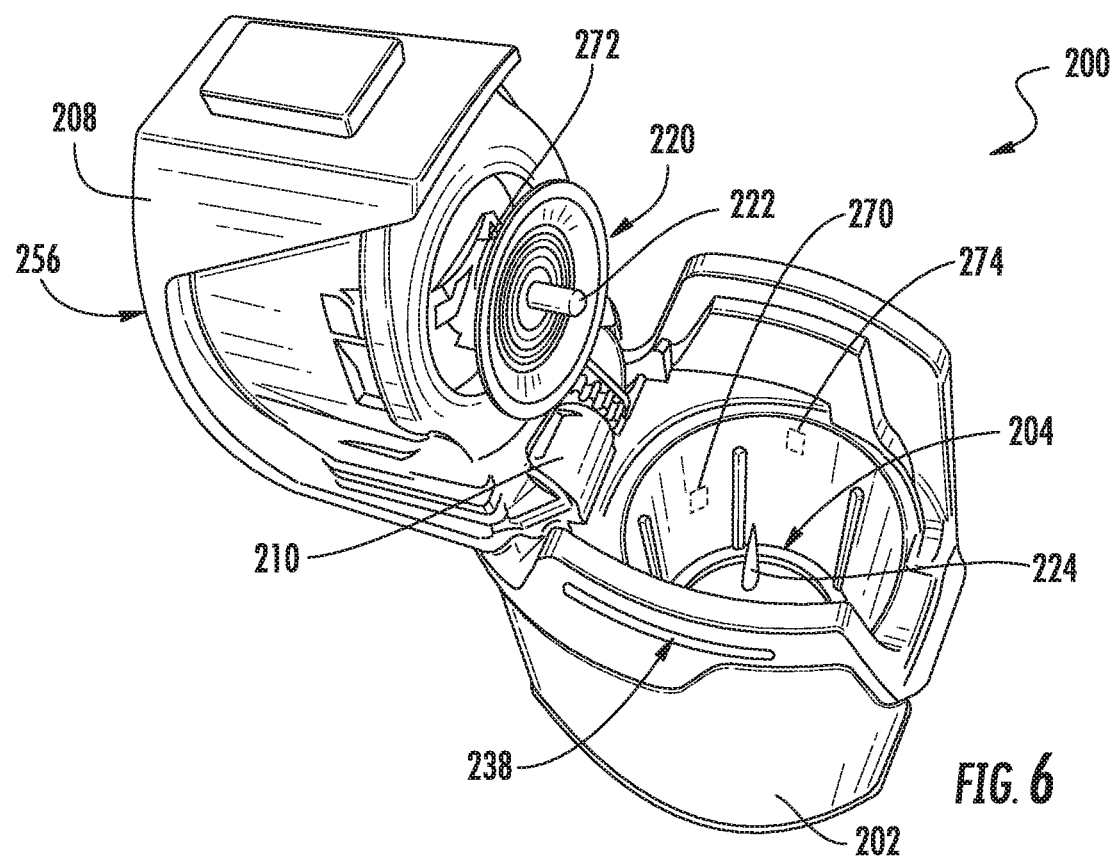
FIG. 6 provides another perspective view of the exemplary brew module of FIG. 3, with the lid shown in the open position.

As illustrated, brew module 200 may include a body 202 that defines a brew chamber 204. Brew chamber 204 may be a substantially cylindrical chamber that is configured to receive a brew pod 206 (FIG. 5). A lid 208 is pivotally attached to body 202 with a hinge 210 to permit selective access to brew chamber 204. More specifically, lid 208 is pivotable between a closed position (FIGS. 3 and 4) and an open position (FIGS. 5 and 6). According to the illustrated embodiment, an inlet 212 is defined within lid 208 of brew module 200 for receiving the flow of heated water 178. In addition, a bottom of brew module defines an outlet 214 for dispensing the brewed beverage.

As shown in FIGS. 5 and 6, brew module 200 includes an upper needle assembly 220, which includes an upper needle 222 positioned proximate a top of brew chamber 204. In addition, brew module 200 includes a lower needle 224 positioned proximate a bottom of brew chamber 204. Needles 222, 224 are each configured for piercing brew pod 206 and may define one or more channels and/or apertures for passing liquid through needles 222, 224. For example, upper needle 222 and lower needle 224 may each define flow channels (not shown) which permit the flow of heated water 178 to enter brew pod 206 through inlet 212 and pass into brew chamber 204 to facilitate the brewing or beverage making process. After the brew pod 206 contents have brewed or mixed, the flow of heated water 178 passes through lower needle 224 to outlet 214 of brew pod 206. Brew module 200 may further include one or more vents (not shown) to prevent a vacuum from being created within brew chamber 204 and allow liquid to flow smoothly out of outlet 214.

As shown in FIG. 5, brew pod 206 is placed in brew chamber 204 when lid 208 is pivoted to the open position. Brew pod 206 is generally a container which contains or is fillable with a predetermined amount of brewing contents, such as coffee, tea, hot chocolate, lemonade, or the like. The brewing contents are mixed with water to create a beverage that is dispensed to the user. According to some embodiments, brew pod 206 may also include a filter (not shown) positioned within brew pod 206 and configured for filtering brewing contents, such as coffee grounds or tea leaves. Brew pod 206 may be a single-use pod or a reusable pod. A top cover 230 of brew pod 206 may enclose an opening of brew pod 206. Top cover 230 may be pierced, e.g., with upper needle 222. In particular, the top cover 230 may be formed from a suitable foil material, such as aluminum foil, e.g., when brew pod 206 is a single-use pod. Similarly, a bottom 232 of brew pod 206 may be pierced, e.g., with lower needle 224. Brew pod 206 may additionally include a lip 234, which may facilitate placing the brew pod 206 in brew module 200.

Figure 2:
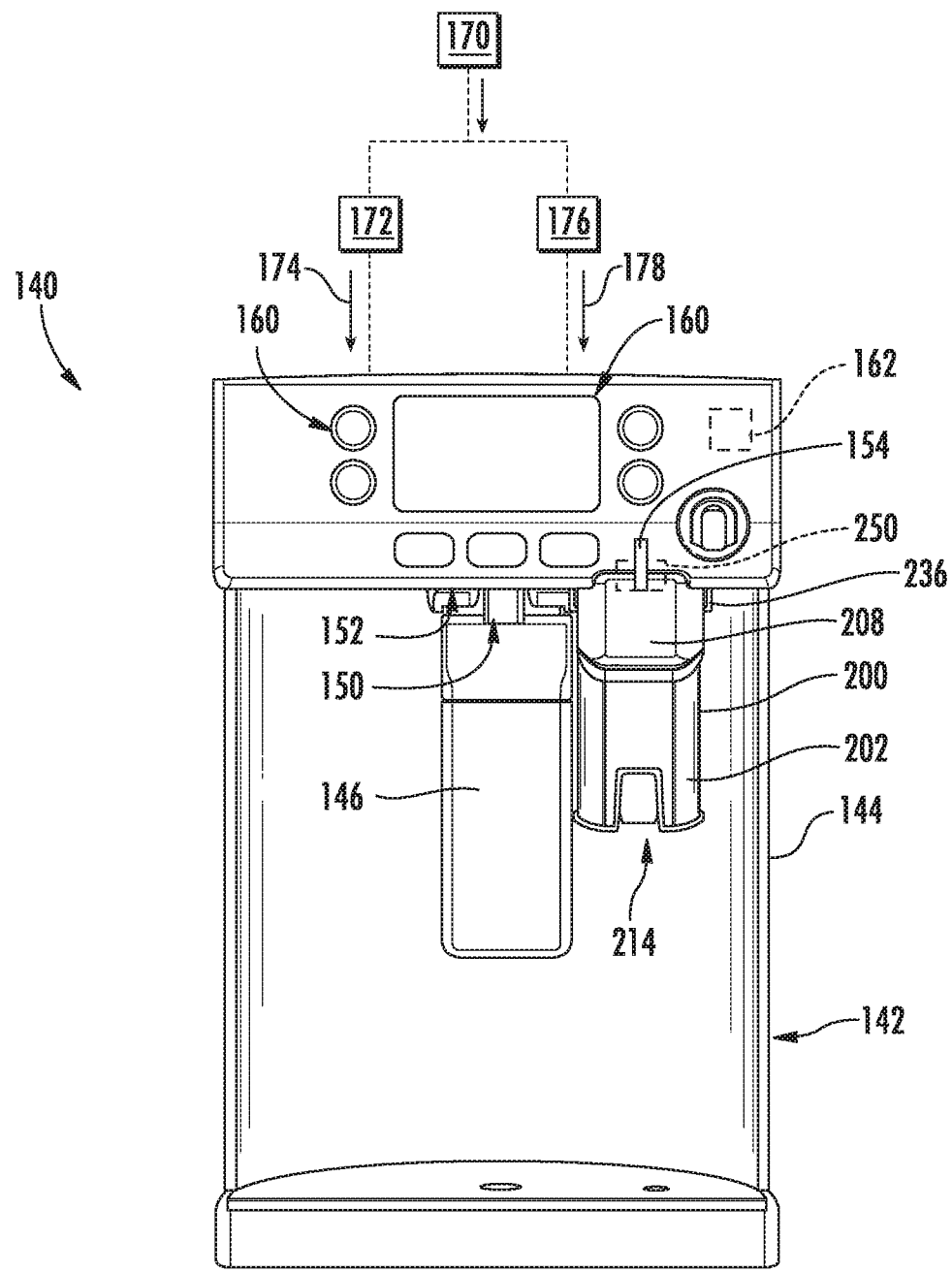
FIG. 2 provides a front view of a dispensing assembly of the exemplary refrigerator appliance of FIG. 1.
Figure 3:
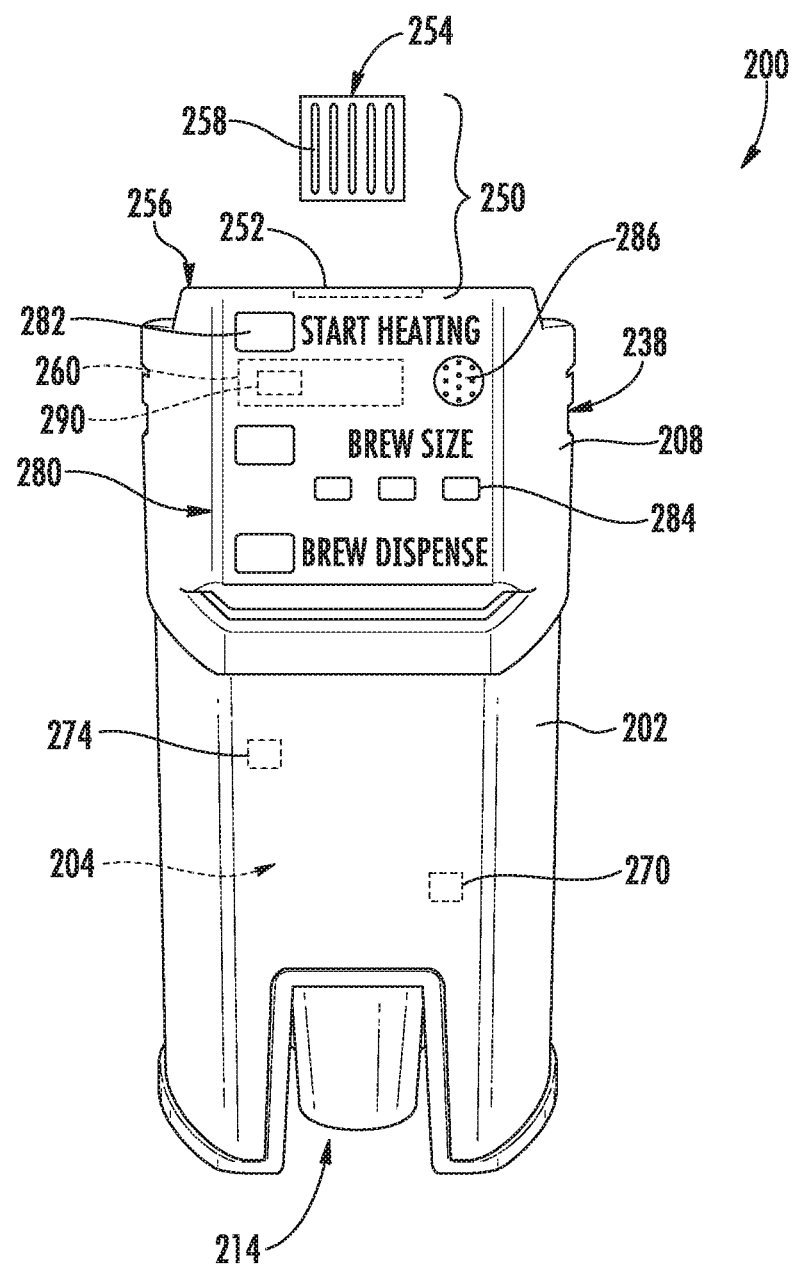
FIG. 3 provides a front view of a brew module that may be used with the exemplary dispensing assembly of FIG. 2, with a lid shown in the closed position.
Figure 4:
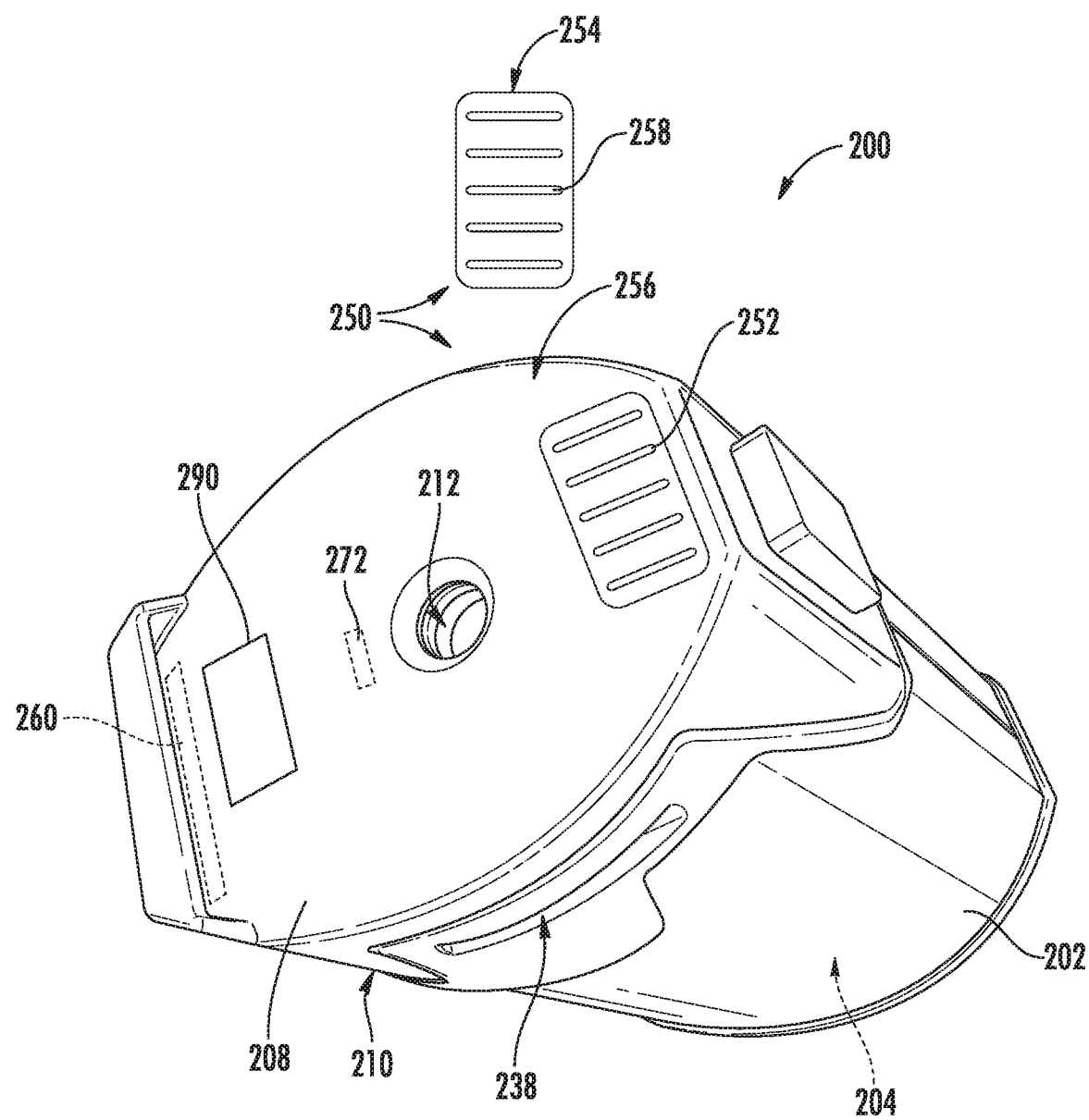
FIG. 4 provides a perspective view of the exemplary brew module of FIG. 3, with the lid shown in the closed position.

As best shown in FIGS. 2 through 4, dispensing assembly 140 further includes features for mounting brew module 200 to dispenser 144. For example, dispenser 144 may define a plurality of flanges 236 that extend down from dispenser 144 and toward each other. Body 202 of brew module 200 defines corresponding slots 238 on either side that are configured to receive flanges 236. In this manner, a user may slide brew module 200 into engagement with dispenser and flanges 236 may hold brew module 200 in place while dispensing the beverage. Although a slot/flange arrangement is described herein, one skilled in the art will appreciate that any suitable means of mounting brew module 200 to dispenser 144 may be used while remaining within the scope of the present subject matter. For example, dispenser 144 may define a tray that is configured to receive and secure brew module 200, different slot and flange configurations are possible, or other mechanical means of securing brew module 200 to dispenser 144 may be used.

One skilled in the art will appreciate that brew module 200 is used only for the purpose of explaining certain aspects of the present subject matter. Variations and modifications may be made without departing from the scope of the present subject matter. For example, different chamber configurations may be used, alternative needle geometries are possible, and other changes may be made as well while remaining within the scope of the present subject matter.

Referring now specifically to FIGS. 3 and 4, brew module 200 may further include an electrical connection assembly 250 which is generally configured for electrically coupling brew module 200 to refrigerator appliance 100. More specifically, electrical connection assembly 250 may include one or more electrical contacts 252 that are positioned on brew module 200 and an electrical docking port 254 that is mounted within dispenser recess 142. Electrical contacts 252 are electrically coupled with docking port 254 when brew module 200 is mounted to dispenser assembly 140, e.g., when flanges 236 are received within slots 238 of brew module 200.

As best shown in FIG. 4, electrical contacts 252 are mounted on a top 256 of lid 208 of brew module 200. In addition, docking port 254 is mounted to an underside of dispenser 144, e.g., adjacent hot water outlet 154. However, it should be appreciated that according to alternative embodiments, electrical contacts 252 and/or docking port 254 may be positioned at any other suitable location to achieve the desired electrical connection, e.g., at a rear of brew module 200. Alternatively, electrical connection assembly 250 may include a conventional power supply cable and outlet, a USB connector and USB port, or any other suitable electrical couplings as are known in the art.

As illustrated, docking port 254 includes one or more spring-loaded connectors 258 which are used to electrically connect light sources electrical contacts 252 to controller 162. In this regard, for example, spring-loaded connectors 258 may include protruding spring-loaded pins, cantilevered contacts, or any other suitably resilient electrical contacts that are urged against electrical contacts 252 of brew module 200 when installed within dispensing assembly 140.

Notably, the electrical connection achieved by using electrical connection assembly 250 may be used for a variety of purposes to facilitate improved user interaction and performance of brew module 200 and dispensing assembly 140. Specifically, for example, electrical connection assembly 250 may be used to provide electrical power from refrigerator appliance 102 brew module 200. This electrical power may be used to facilitate the operation of various sensors, user interface panels, and other features of brew module 200, as described in detail below. Electrical connection assembly 200 may also be used to establish data communication between refrigerator appliance 100 and brew module 200. As used herein, "data communication" is generally intended to refer to the communication of information between refrigerator appliance 100 (e.g., controller 162) and brew module 200, as opposed to the provision of electrical power for supporting module operation.

Notably, according to exemplary embodiments, brew module 200 may include its own internal control module 260, which may for example include control electronics (e.g. similar to controller 162). According to an exemplary embodiment, internal control module 260 is powered through electrical connection assembly 250 and may transmit and/or receive data communication with controller 162 of refrigerator appliance 100. According to still another, brew module 200 may not include an internal control module 260. In such an embodiment, the various sensors, meters, status indicators, and user interface panels described below are powered and operated directly through electrical connection assembly 250 and controller 162 of refrigerator appliance 100.

Referring still generally to FIGS. 3 through 6, brew module 200 may further include a variety of sensors, meters, and other detection systems for monitoring a brewing process or brew module 200 more generally. Specifically, for example, brew module 200 may include a temperature sensor 270 that is mounted within brew chamber 204 or otherwise in thermal communication with brew chamber 204 for monitoring the temperature of the flow of heated water 178 into brew chamber 204. As used herein, "temperature sensor" may refer to any suitable type of temperature sensor. For example, the temperature sensors may be thermocouples, thermistors, or resistance temperature detectors. In addition, although exemplary positioning of a single temperature sensor 270 is illustrated herein, it should be appreciated that brew module 200 may include any other suitable number, type, and position of temperature sensors according to alternative embodiments.

The measured temperature may be used as feedback to controller 162 for adjusting the temperature towards a target temperature, e.g., a desired water temperature for a particular brew pod 206. In this regard, for example, internal control module 260 may be in direct communication with heating assembly 176 of refrigerator appliance 100, e.g., for increasing or decreasing the temperature of the flow of heated water 178 as desired based on the measured temperature. Alternatively, internal control module 260 or temperature sensor 270 may be in direct communication with controller 162.

In addition, brew module 200 may include a flow meter 272 that is generally configured for measuring a flow rate of the flow of heated water 178 into brew chamber 204. According to an exemplary embodiment, the flow rate is used to determine a volume of water within brew chamber 204. According still another embodiment, any other suitable water level sensor, such as an ultrasonic water level sensor 274 may be used to detect a water level within brew chamber 204. Notably, the desired volume of water within brew chamber 204 may vary depending on the type of brew pod 206 used. Therefore, flow meter 272 or water level sensor 274 may be used to ensure the proper amount of water is provided for facilitating an improved brewing process.

In addition, as best shown in FIG. 3, brew module 200 may include a user interface panel 280 that permits a user to monitor and/or control the operation of brew module 200 during a beverage making process. In this regard, for example, user interface panel 280 may include at least one input device 282 and at least one status indicator 284. In general, input device 282 may be any suitable device for receiving an input from a user of refrigerator appliance 100, such as a push button, a rotary dial, a touch screen interface, etc. Similarly, status indicator 284 may be any suitable device for providing an indication to a user regarding the performance of brew module 200 or refrigerator appliance 100. For example, status indicator may be an indicator light, a display, etc. According still other embodiments, status indicator 284 may be ambient or decorative lighting. In this regard, for example, outlet 214 of brew module 200 may be surrounded with ambient lighting to provide a user with an indication of where to position their cup prior to initiating a beverage dispensing process.

According to still other embodiments, brew module 200 may include an audio device 286 for providing an audible indication or receiving voice commands from a user of brew module 200. For example, as shown in FIG. 3, audio device 286 includes a microphone and a speaker positioned on brew module 200, e.g. within user interface panel 280. According to alternative embodiments, any other suitable audio device may be used, such as a buzzer, a beeper, etc.

Referring now to FIGS. 4 and 5, brew module 200 may further include a radio frequency identification (RFID) reader 290 that reads an RFID tag 292 on brew pod 206. RFID reader 290 may thus be configured for reading RFID tag 292 to determine the appropriate brewing process for a particular brew pod 206. For example, each brew pod 206 may have a unique RFID tag 292 that specifies an appropriate volume of water, temperature of water, brewing time, and/or other brewing characteristics for improved performance of brew module 200. When brew pod 206 is inserted into brew chamber 204, RFID reader 290 may obtain or determine the appropriate brewing parameters which may be communicated to controller 162 directly or via internal control module 260. Refrigerator appliance 100 may then regulate the flow of heated water 178, the operation of heating assembly 176, and other system components to achieve the desired volume, temperature, and other brewing parameters as needed.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal languages of the claims.

What is claimed is:

1. A refrigerator appliance comprising:
   a cabinet defining a chilled chamber;
   a door being rotatably hinged to the cabinet to provide selective access to the chilled chamber, the door defining a dispenser recess;
   a dispensing assembly positioned within the dispenser recess for providing a flow of water; and
   a brew module being removably mounted to the dispensing assembly, the brew module comprising:
   a brewing body defining a brew chamber configured to receive a brew pod and the flow of water from the dispensing assembly to mix with contents of the brew pod to create a beverage;
   an electrical docking port mounted within the dispenser recess; and
   electrical contacts positioned on the brew module, the electrical contacts being configured to directly contact the electrical docking port and electrically coupling the brew module and the dispensing assembly when the brew module is installed onto the dispensing assembly and to establish data communication between the refrigerator appliance and the brew module through the electrical docking port and the electrical contacts; and wherein the brew module comprises: an internal control module powered by the refrigerator appliance through the electrical docking port and the electrical contacts.

2. The refrigerator appliance of claim 1, wherein at least one of the electrical contacts or the electrical docking port comprises a spring-loaded electrical contact member.

3. The refrigerator appliance of claim 1, wherein the brew module comprises:
a lid pivotally mounted to the brewing body for sealing the brew pod within the brew chamber, the lid defining an inlet for receiving the flow of water, and wherein the electrical contacts are mounted on a top or a rear of the lid;
an outlet defined on a bottom of the brewing body.

4. The refrigerator appliance of claim 1, comprising:
a heating element positioned within the refrigerator appliance and being configured for heating the flow of water.

5. The refrigerator appliance of claim 4, wherein the brew module comprises:
a temperature sensor for measuring a temperature of the flow of water, and wherein the heating element is regulated to adjust a measured temperature toward a target temperature.

6. The refrigerator appliance of claim 1, wherein the brew module comprises:
a flow meter for measuring a flow rate of the flow of water, and wherein the flow rate is used to determine a volume of water in the brew chamber.

7. The refrigerator appliance of claim 1, wherein the brew module comprises:
a water level sensor for measuring a volume of water in the brew chamber.

8. The refrigerator appliance of claim 1, wherein the brew module comprises:
a user interface panel comprising at least one of an input device and a status indicator.

9. The refrigerator appliance of claim 1, wherein the brew module comprises:
ambient or decorative lighting.

10. The refrigerator appliance of claim 1, wherein the brew module comprises:
an audio device comprising at least one of a microphone, a buzzer, and a speaker.

11. The refrigerator appliance of claim 1, wherein the brew module comprises:
a radio frequency identification (RFID) reader configured for reading an RFID tag on the brew pod to determine a pod type.

12. The refrigerator appliance of claim 11, wherein the refrigerator appliance regulates the flow of water based on the pod type as indicated by the RFID tag.

13. The refrigerator appliance of claim 12, wherein the refrigerator appliance regulates at least one of a volume and a temperature of the flow of water in response to determining the pod type from the RFID tag.

14. A brew module for use with a refrigerator appliance, the refrigerator appliance comprising a dispensing assembly for providing a flow of water, the brew module comprising:
a brewing body removably mounted to the dispensing assembly, the brewing body defining a brew chamber configured to receive a brew pod and the flow of water from the dispensing assembly to mix with contents of the brew pod to create a beverage;
an electrical docking port mounted within the dispenser assembly; and
electrical contacts positioned on the brew module, the electrical contacts being configured to directly contact the electrical docking port and electrically coupling the brew module and the dispensing assembly when the brew module is installed onto the dispensing assembly and to establish data communication between the refrigerator appliance and the brew module through the electrical docking port and the electrical contacts; and
wherein the brew module comprises: an internal control module powered by the refrigerator appliance through the electrical docking port and the electrical contacts.

15. The brew module of claim 14, wherein at least one of the electrical contacts and the electrical docking port comprises a spring-loaded electrical contact member configured for engaging the electrical contacts when the brew module is installed onto the dispensing assembly.

16. The brew module of claim 14, comprising:
a user interface panel comprising at least one of an input device and a status indicator.

17. The brew module of claim 14, comprising:
a radio frequency identification (RFID) reader configured for reading an RFID tag on the brew pod to determine a pod type, and wherein the refrigerator appliance regulates at least one of a volume and a temperature of the flow water based on the pod type as indicated by the RFID tag.

* * * * *